UNITED STATES PATENT OFFICE.

ERICH SCHWANENBERG AND ALBERT RINNE, OF HANOVER, GERMANY.

PROCESS FOR HARDENING ARTIFICIAL STONE.

No. 886,258.  Specification of Letters Patent.  Patented April 28, 1908.

Application filed December 4, 1906. Serial No. 346,308.

*To all whom it may concern:*

Be it known that we, ERICH SCHWANEN-BERG, a subject of the King of Prussia, residing at Hanover, Germany, and ALBERT RINNE, a subject of the King of Prussia, residing at Hanover, Germany, have invented certain new and useful improvements in processes for hardening artificial stones of hydrate of lime and filling substances by means of carbonic acid or gases containing carbonic acid, of which the following is a specification.

Numerous processes have already been proposed for hardening artificial stone containing hydrate of lime, by means of carbonic acid or gases containing the same. Thus, it has been proposed to treat the artificial blocks with carbonic acid at ordinary temperature under gradually increasing pressure, in such manner that a constant temperature of 32° C. is produced and maintained in order to obtain a thorough action of the carbonic acid. It has also been proposed to use carbonic acid of very high percentage in order to effect a very rapid hardening and drying of the "block". Of these processes the first is undesirable because it necessitates very strong vessels and the blocks must be dried beforehand; this process seems to necessitate also the employment of carbonic acid of high percentage. The second process not only necessitates the use of carbonic acid of very high percentage, but is undesirable for the further reason that the temperature produced by the combination of the carbonic acid with the lime falls rapidly by reason of the fact the reaction is greatly abated in consequence of the newly-formed calcium-carbonate surrounding the hydrate of lime. Thus a sufficient evaporation of the resultant moisture in the blocks does not take place, and a thorough and lasting action of the carbonic acid does not occur. Finally, it has been proposed to allow the hot gases coming from lime-kilns or the like to act directly upon the blocks. This process is undesirable because the evaporation of the moisture from the blocks cannot be properly regulated, because of the changeable composition and temperature of the kiln-gases, as they are produced during the activity of the kiln. The use of hot lime-kiln-gases produces blocks that are soft and of little solidity.

The reason for this is to be found particularly in the fact that the evaporation of the water out of the blocks proceeds too rapidly if the operation is conducted at a temperature much higher than the boiling-point of water, that is, over, say, 110° C. The stones thus become too dry, and a large part of the hydrate of lime contained in the blocks is not subjected to the action of the carbonic acid. All these disadvantages can be avoided and very solid blocks obtained if the carbonic acid which is used for the treatment of the same be kept at a temperature of from 35° to 110° C. and sufficiently free from humidity that at the same time it exerts drying function, that is it takes up moisture. In this manner without employing pressure and gases of high percentage and without drying the block beforehand, a thorough conversion of the lime into carbonate can be effected in a short time.

To carry out the process, use may be made of the gases containing carbonic acid, which come from lime-kilns, boiler-furnaces, etc. These gases must be cooled to the designated temperatures and the moisture contained in them eliminated in a suitable manner, so as to render them capable of taking up moisture from the blocks.

The temperature of the gases used in the treatment must be regulated according to the constitution of the blocks treated, especially with reference to their porosity and the amount of hydrate of lime contained, as well as the purity of the carbonic acid gas. Where the blocks are solid and rich in hydrate of lime, or where the carbonic acid is concentrated, higher temperatures are taken. It is of special importance in the process however that the designated maximum temperature be not exceeded. Experiments have shown that at a temperature above about 110° C. the carbonic acid acts but incompletely, the hyrdate of lime drying in part and in this condition resisting the action of the carbonic acid.

The blocks to be treated may consist of hydrate of lime or of a mixture of hydrate of lime with calcium carbonate or magnesium-carbonate, such as limestone, dolomite, magnesite or the like, in combination under certain circumstances with coloring-matters, mineral "filling" substances, etc. By hydrate of lime is meant slaked burned lime or burned substances (such as, for instance, hydraulic lime treated with water), containing quick lime, treated with water.

We claim as our invention

1. The process of hardening artificial blocks containing hydrate of lime which consists in treating the same with carbonic acid gas at a temperature between 35° and 110° C. and capable of taking up moisture.

2. The process of hardening artificial blocks containing hydrate of lime and suitable carbonates which consists in treating the same with carbonic acid gas at a temperature between 35° and 110° C. and capable of taking up moisture.

3. The process of hardening artificial blocks containing hydrate of lime and suitable coloring matters, which consists in treating the same with carbonic acid gas at a temperature between 35° and 110° C. and capable of taking up moisture.

In testimony whereof we have signed our names to this specification, in the presence of two subscribing witnesses.

ERICH SCHWANENBERG.
ALBERT RINNE.

Witnesses:
ALFRED SCHWANENBERG,
PAUL K. THOMPSON.